United States Patent
Le Buhan et al.

(10) Patent No.: US 7,616,763 B2
(45) Date of Patent: Nov. 10, 2009

(54) VALIDITY VERIFICATION METHOD FOR A LOCAL DIGITAL NETWORK KEY

(75) Inventors: Corinne Le Buhan, Les Paccots (CH); Rached Ksontini, Lausanne (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 530 days.

(21) Appl. No.: 10/521,451

(22) PCT Filed: Aug. 14, 2003

(86) PCT No.: PCT/IB03/03767

§ 371 (c)(1), (2), (4) Date: Sep. 15, 2005

(87) PCT Pub. No.: WO2004/017635

PCT Pub. Date: Feb. 26, 2004

(65) Prior Publication Data

US 2006/0107045 A1 May 18, 2006

(30) Foreign Application Priority Data

Aug. 19, 2002 (CH) ................... 1403/02

(51) Int. Cl.
H04N 7/167 (2006.01)
(52) U.S. Cl. .................................. 380/239
(58) Field of Classification Search ............ 380/200, 380/239, 223; 726/30; 713/155
See application file for complete search history.

(56) References Cited

U.S. PATENT DOCUMENTS

| | | | | |
|---|---|---|---|---|
| 6,038,321 A | * | 3/2000 | Torigai et al. | 380/268 |
| 6,925,562 B2 | * | 8/2005 | Gulcu et al. | 713/172 |
| 7,237,108 B2 | * | 6/2007 | Medvinsky et al. | 713/160 |

FOREIGN PATENT DOCUMENTS

| | | |
|---|---|---|
| EP | 1 079 628 A2 | 2/2001 |
| WO | WO 00/56068 | 9/2000 |
| WO | WO 01/99422 A1 | 12/2001 |

* cited by examiner

Primary Examiner—Emmanuel L Moise
Assistant Examiner—Ali S Abyaneh
(74) Attorney, Agent, or Firm—Harness, Dickey & Pierce, P.L.C.

(57) ABSTRACT

The aim of this invention is to propose a control method for the conformity of a network key (NK). This method is applied during the transfer of data coming from a conditional access source to a domestic network. It handles on the verification of the network key (NK) authenticity using relevant control data provided by the verification center in general in form of a list $\{(TK)_{NK1}, (TK)_{NK2}, (TK)_{NK3} \ldots \}$.

A verification of the presence or absence of a cryptogram $(TK)_{NK}$ is carried out according to the list $\{(TK)_{NK1}, (TK)_{NK2}, (TK)_{NK3} \ldots \}$. The cryptogram $(TK)_{NK}$ is constituted from a test key (TK), provided by the verification center, encrypted by a network key (NK) of a security module (CT) of a device (TV1, TV2, PC) connected to the network.

16 Claims, 2 Drawing Sheets

VALIDITY VERIFICATION METHOD FOR A LOCAL DIGITAL NETWORK KEY

This invention concerns a method for securing a digital domestic network. In particular, the method of the invention is articulated on the unique device networks whose contents are personalized.

BACKGROUND

A digital domestic network is a set of audio-video device linked by digital interfaces. These device include for example digital decoders, digital televisions, DVD players/recorders, storage device equipped with hard disks, MP3 audio recorders, electronic books, games consoles, computers or other platforms allowing Internet access.

Digital technology offers the possibility of producing copies of the contents (cinema, music, videos games, software . . . ) that are of the same quality as the original. These perfect copies imply disastrous consequences for the industry regarding the copyright if an efficient protection method is not available.

The original contents arrive in house by different sources: it can be transmitted by radio channel, by satellite or cable, through the Internet, or it can be recorded onto a digital cassette, a DVD or onto a hard disk. Before supplying their contents to distributors, the rights' holders specify certain access conditions relating to the protection of the contents that must be put into force by an in house content protection system.

The content can, for example, be associated with rights such as: "Read only", "copy for private use ", "Free copy".

A digital content protection system allows content owners and distributors to fight against revenue loss due to piracy. It is based on the use of security modules that allow the identification of each device connected to the domestic network and the decryption of the data.

The advantage of such a system is that the content is always conserved encrypted in the digital domestic network until reading. Decryption is carried out in collaboration with the removable security module inserted into the reading device. This simple method offers security means complete with encryption.

Such a protection system is qualified as "end to end", that is to say from the entrance of the content onto the digital domestic network until its use, via its eventual storage.

With this system, the content suppliers can easily choose rights for the encrypted data users that will be applied to the domestic network.

The possibility of duplicating and managing digital content inside the network is thus offered to the user in the framework of the rights defined by content suppliers. It allows the user to share the content stored on any stand alone or portable connected digital device, while preventing the redistribution of this content outside the domestic network.

The system creates a secure environment: allowing the recording of the encrypted content, but prohibiting the reading of illegitimate contents. Illegitimate content is a copy not authorized by the holder of the ownership rights. For example, a disk copied from an original on a device belonging to a network A cannot be read by a device connected to a network B.

All restricted access content is linked to a given domestic network and, therefore, can be used only on that same network. The identity of the network is assured by security modules that, due to the fact that they are removable, allow a certain amount of mobility.

However, a domestic network can also comprise movable external device connected to this network, for example a portable music player or a device in a car, as well as device in a second residence that belongs to the owner of the initial network. In other words, the contents are protected by the same key when the external devices have been connected to the reference network at least once. It is thus unnecessary to have a permanent connection. All these devices share a private domestic network key, on which the content is available for private use, but only according to the ownership rights.

The protection system whose principles are mentioned above is described in the Thomson Multimedia Ltd document: "SmartRight"™, A Content Protection System for Digital Home Networks, White Paper" published in October 2001.

According to a particular configuration, the entry point of a digital domestic network comprises of a decoder ("Set-Top-Box") that receives an encrypted data stream from a satellite, a cable, by the Internet. This decoder is provided with a security module in general in the form of a chip card called a converter module. The role of this card consists of managing the conditions defined by the access control of the conditional access supplier to decrypt the control messages (ECM) containing the control-words (CW) allowing the deciphering of the contents if the rights are present in this module. In the affirmative, this module re-encrypts the control-words (CW) thanks to a session key randomly generated by the module. This module adds to the control-words (CW) the session key encrypted by the network key to form local control messages (LECM).

According to a second possibility, the entry point is a data reader such as a DVD reader. The data are stored in an encrypted configuration and a module in the reader is able to decrypt these data. Once decrypted, they are re-encrypted according to the local connected network and broadcasted in this network. According to the operating mode, it is possible not to decrypt the data but to process only the encryption key(s). In fact, a known method consists to encrypt the data with one or more session keys (randomly determined) and to encrypt these keys with a key fitted to the system and known by the DVD reader. This reader decrypts the whole key set and re-encrypts this set thanks to the local key. The data themselves are not processed and remain in their original configuration. In this realization, the converter module is the module including the means for decrypting the set of keys and encrypting them for the local network.

In both above described cases, one will talk about broadcasting device because its main function is to broadcast data in a local network.

The network key is a key belonging to a given network. It is generated in the network by means of a security module called a terminal module linked to the first content visualization device connected to the network. This module is the only one capable of initializing the network. An additional terminal module then receives the network key from the first device. This terminal module is in general a chip card or it can be a circuit mounted directly in the processing device.

On the other hand, the network key is not known by the converter module so as to avoid gathering together all the secrets, which would constitute an excellent attack target for pirates. Therefore, a secure communication mechanism must be put in place between a terminal module and the converter module so that the latter can insert the session key encrypted by the network key in the control messages (LECM) that it generates.

For this purpose, the terminal module exchanges with the converter module a public key known by the terminal module and a session key randomly generated by the converter module. The terminal module transmits its public key to the converter module that returns the encrypted session key with the public key. The terminal module then decrypts the session key, then retransmits this encrypted session key with the network key to the converter module.

The converter module encrypts on one hand the control-words (CW) using the session key and on the other hand, it joins the encrypted session key with the network key (coming from one of the terminal modules) to form the local control messages (LECM). These messages (LECM) are then transmitted with the encrypted contents using different network device for storage or visualization.

Each terminal device connected to the network can thus decrypt the messages (LECM) and extract the control-words (CW) because it has the network key and receives the session key encrypted by the network key. It is able than, using these control-words (CW), to decrypt the data stream. These devices are called processing device.

This setting up method of a network key contained in a terminal module presents a drawback due to the fact that it is technically possible to initialize a multitude of domestic networks by means of a fake terminal module. In fact, in the known protection system, the network key is not contained as such in the converter module, but only in the form of a session key encrypted by the network key. The unauthorized networks established in this way can thus all possess the same key and therefore, the content stored in the devices can be redistributed and exploited outside the limited number of members such as those defined in the standards for a domestic network.

Furthermore, a predefined network key not recognized by the content supplier can be introduced onto a terminal module allowing the creation of a network whose content ownership is no longer directed by the holder.

SUMMARY

Example embodiments are to avoid the drawbacks described above by proposing a control method for the conformity of the network key.

Example embodiments use a validity verification method of a network key in a digital domestic network comprising at least a broadcasting device and a processing device, the broadcasting device having encrypted data to broadcast to the processing device, these data being accessible by the processing device thanks to a network key unknown by the broadcasting device, this method comprising following steps:

transmission of a test key by the broadcasting device to the processing device,
calculation of a cryptogram in the processing device resulting from the test key encryption by the network key,
sending of the cryptogram to the broadcasting device,
determination of the network key validity by the broadcasting device by comparing the cryptogram with a list of control cryptograms.

The method applies generally during the transfer of data coming from a conditional access source to a domestic network. It handles on the verification of the authenticity of a network key using relevant control data provided by a verification center in general in form of a list.

The method is based on the verification of the presence or absence of a given cryptogram in a control list: the cryptogram being constituted from a test key, provided by the verification center, encrypted with a network key of a terminal module of a device connected to the network.

The control list provided by the verification center contains cryptograms created either with invalid network keys ("black list"), or with valid keys ("white list"). Therefore, a network key contained in a terminal module will be then valid only if its corresponding cryptogram is absent in a "black list" or present in a "white list".

In the case of a DVD reader, the data of a film, for example, are accompanied by a file of invalid (or valid) cryptograms and the comparison can be carried out on the same way than for a decoder.

According a first embodiment, the data allowing verifying a network key include a test key and a set of cryptograms, that is to say the result of the encryption of the test key with all valid or invalid network keys. The test key is sent to the processing device and the cryptogram sent back is compared with this list.

According a second embodiment, the data allowing verifying a network key include the set of invalid network keys. The test key is randomly generated by the broadcasting device and transmitted to the processing device. The cryptogram sent back is stored and compared with the cryptograms generated by the broadcasting device by encrypting the test key with each invalid network key.

For the continuation of the description, the converter module located in the broadcasting device will be mentioned for the verifying operations. In the same way, the terminal module carries out the operations for the processing device with which this module in linked.

According to a realization, once the verification successfully passed, the converter module generates a session key, a key that will be transmitted securely to the terminal module of one of the devices. This session key is then encrypted by the network key of the terminal module to create a cryptogram that is sent back to the converter module. The converter module will use this session key to encrypt the control-words (CW) and to transmit them either to a processing device, either to a storing device accompanied by the cryptogram.

If the comparison is negative, the converter module stops the generation of the control data stream accompanying the contents and allowing its decryption within the domestic network. An error message invites the user to change terminal module. In a variant where the broadcasting device has a return channel, this message can also be transmitted to the verification center in order to indicate an invalid terminal module.

According to this method the session key is replaced, in a test phase, by a test key with a predefined value. The test key then plays a similar role to that of the session key of the initialization method described above.

BRIEF DESCRIPTION OF THE DRAWING

The invention will be better understood thanks to the following detailed description that refer to the attached figures serving as a non-limitative example, namely.

DETAILED DESCRIPTION OF THE EXAMPLE EMBODIMENTS

Figure 1:
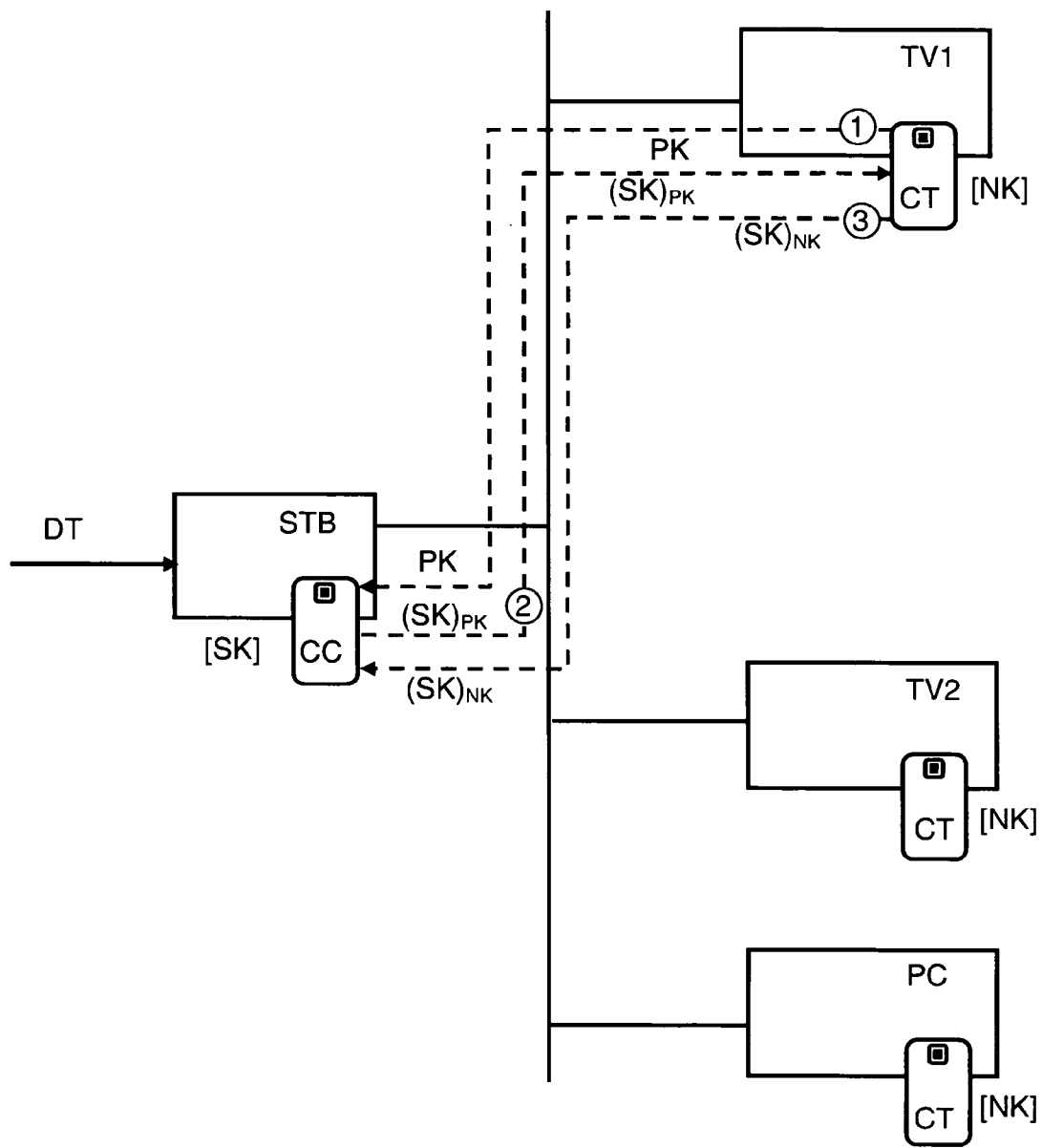
FIG. 1 represents a typical communication between a terminal module and a converter module according to the method of the prior art.

The digital domestic network disclosed in FIG. 1 comprises a decoder (STB), televisions (TV1, TV2) and a computer (PC). Each device is provided with a removable chip card serving as a security module responsible for encrypting/decrypting the network data. According to a particular variant, the module of the chip card can be directly mounted on the device permanently.

According to a preferred realization, the card linked to the decoder (STB) is a converter module (CC) that transforms control messages ECM (Entitlement Control Message) received by the decoder in local ECM (LECM) of the network. The latter contain the decrypting keys or control-words (CW) of the data stream (DT) coming from the management center encrypted by a transmission key (TK). The local ECM (LECM) as well contains the control words (CW) of the data stream (DT) encrypted by a local session key, but they contain also this session key encrypted by the network key (NK).

The cards linked to visualization device (TV1, TV2, PC) belonging to the network are terminal modules (CT) that allow the decryption of the network data at the level of the device (TV1, TV2, PC) thanks to the network key (NK) stored in each module.

The link between a conditional access network and a domestic network is carried out by the connection of a device for example (TV1) with the decoder (STB). When the converter module (CC) associated to the decoder (STB) has to transform ECM (Entitlement Control Message) control messages in local ECM (LECM) of the network, a dialogue is established between the terminal module (CT) associated to the device (TV1) and the converter module (CC). This dialogue is carried out securely using a pair of asymmetric keys (public key and private key) specific to the terminal module (CT); it is summarized in 3 steps (1, 2, 3) as follows:

1).- The terminal module of the first device transmits its public key (PK) to the converter module (CC) of the decoder (STB).
2).- The converter module (CC) randomly generates a session key (SK) that it encrypts with the public key (PK) received previously. The converter module (CC) then transmits the encrypted key $(SK)_{PK}$ to the terminal module (CT).
3).- The terminal module (CT) decrypts the session key (SK) using its private key associated to the public key (PK). It then encrypts the session key (SK) by means of the network key (NK) that it stores permanently. The resulting message $(SK)_{NK}$ is transmitted to the converter module (CC).

The local control messages (LECM) comprise finally control-words (CW) encrypted by a session key (SK) and this key (SK) is encrypted by the network key (NK).

The television (TV1) equipped with its terminal module (CT) is then capable to decrypt the local control messages (LECM) thanks to the network key (NK) which serves to decrypt the session key (SK). The latter then allows the decryption of control-words (CW) serving to decrypt the video/audio data destined to the television.

Figure 2:
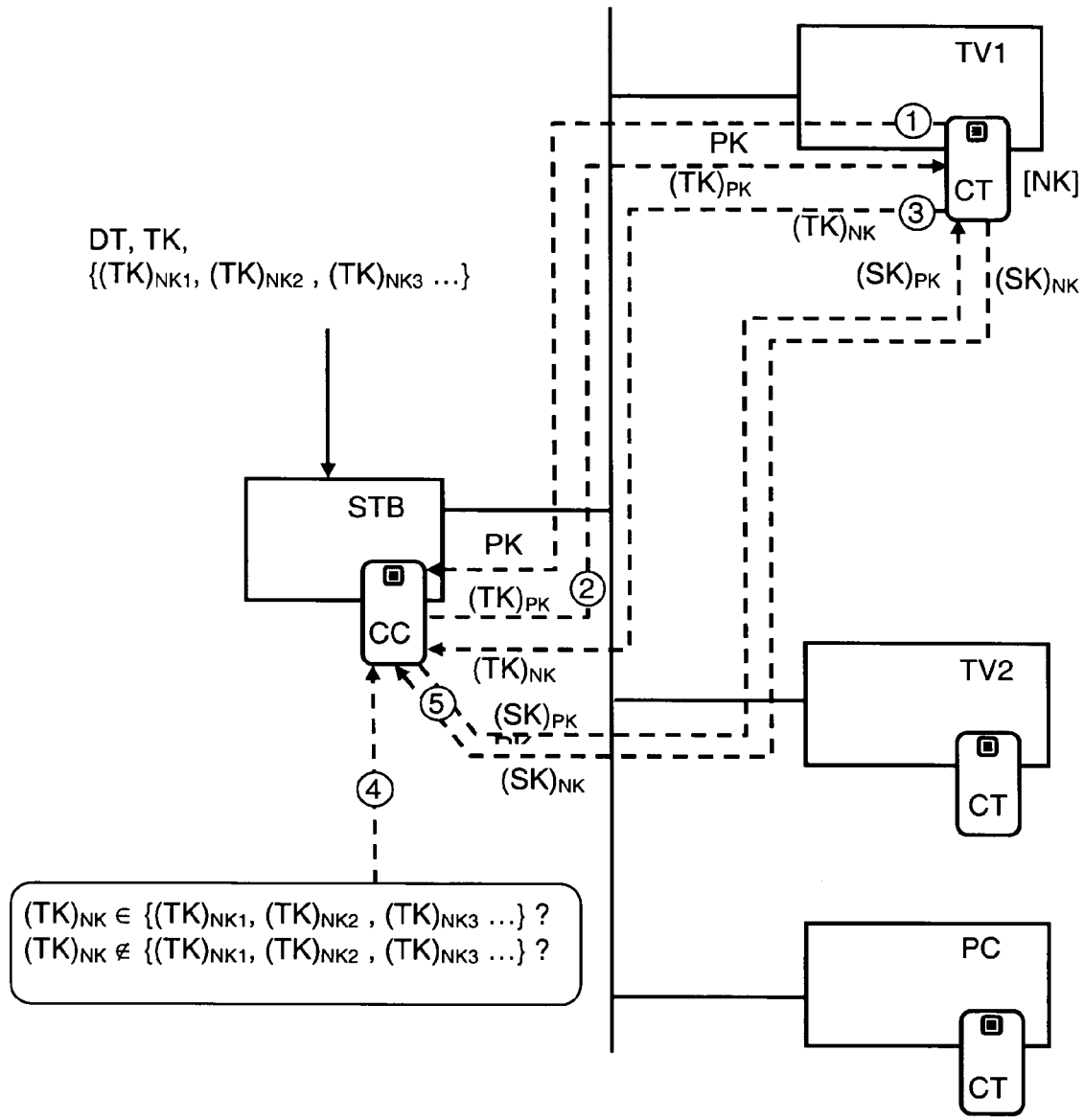
FIG. 2 represents a typical communication between a terminal module and a converter module according to the method of the invention.

FIG. 2 shows the communication initialization method according to the invention whose steps differentiate in reference to the previous by the fact that the session key (SK) is replaced, in a first phase, by a test key (TK). For this, the decoder (or more generally the broadcasting device) has at its disposal a control list $\{(TK)_{NK1}, (TK)_{NK2}, (TK)_{NK3} \ldots\}$ of cryptograms and a test key; the example below concerns the embodiment with a unique test key for all cryptograms:

1).- The terminal module (CT) of the first device transmits its public key (PK) to the converter module (CC) of the decoder (STB).
2).- The converter module (CC) (or the broadcasting device thanks to its more extended memory) has at its disposal a control list $\{(TK)_{NK1}, (TK)_{NK2}, (TK)_{NK3} \ldots\}$ as well as a test key (TK). The converter module (CC) encrypts the test key (TK) with the public key (PK) received from the terminal module (CT), which gives a new message $(TK)_{PK}$ that will be retransmitted to the terminal module (CT).*
3).- The terminal module (CT) decrypts the test key (TK) using its private key associated to the public key (PK). It then encrypts the test key (TK) by means of the network key (NK) that it stores permanently. The resulting cryptogram $(TK)_{NK}$ is transmitted to the converter module (CC).
4).- The converter module compares the cryptogram constituting the test key encrypted by the network key $(TK)_{NK}$ with those indexed in the control list $\{(TK)_{NK1}, (TK)_{NK2}, (TK)_{NK3} \ldots\}$ that can be either a black list that is a list of the unauthorized values, or a white list that is a list of the authorized values.

A cryptogram $(TK)_{NK}$ contained in a black list or absent from a white list is invalid; it means that the network key (NK) used for encrypting the test key (TK) is refused. An adequate indication, as an error message for example, invites the user to change the module and restart the connection operation.

A cryptogram $(TK)_{NK}$ belonging to a white list or absent from a black list is on the other hand accepted. In this case, the converter module (CC) randomly generates a session key (SK) encrypted with the public key (PK) received previously. The converter module then transmits the encrypted key $(SK)_{PK}$ to the terminal module (CT).

5). The terminal module (CT) decrypts the session key (SK) using its private key linked to the public key (PK). It then encrypts the session key (SK) by means of the network key (NK) that it stores permanently. The resulting message $(SK)_{NK}$ is transmitted to the converter module (CC).

In general, the converter module (CC) verifies the authenticity of the control data received by means of a security signature coming from the verification center.

It has to be noted that the processing of the received cryptogram can be made afterwards and in the interval, the converter module authorizes the broadcasting of the data to the processing device. The data handling, as for example a film broadcasting, takes enough time to allow comparison operations with a large number of cryptograms. This is particularly the case when the converter module disposes the network keys to invalidate and has then to calculate for each network key the corresponding cryptogram.

According to an embodiment of the invention, the control list $\{(TK)_{NK1}, (TK)_{NK2}, (TK)_{NK3} \ldots\}$ is stored in the decoder memory after reception, (or more generally of the broadcasting device such as a DVD reader) because it can constitute a file that is too large to be stored in a converter module (CC). The comparison of the cryptogram $(TK)_{NK}$ with the contents in the list $\{(TK)_{NK1}, (TK)_{NK2}, (TK)_{NK3} \ldots\}$ is carried out by the decoder (STB). In this embodiment, in particular for a DVD reader (LDVD), the list can be updated with the more recent DVDs. Thus, when an old DVD is inserted, the list that is attached to it will not be used anymore, but the more recent list coming from a recent DVD stored in the broadcasting device.

According to another variant the verification center transmits, instead of the control list $\{(TK)_{NK1}, (TK)_{NK2}, (TK)_{NK3} \ldots\}$, an address indicating where this list can be downloaded via Internet. This variant needs, either a decoder (STB) with a return channel, or a computer with an Internet connection. The file will then be directly stored in the decoder memory, transmitted from the computer to the decoder.

According to another variant the test key encrypted with the network key $(TK)_{NK}$ is transmitted securely by the converter module (CC) via the decoder (STB) to an adequate server or to the verification center where the list $\{(TK)_{NK1}, (TK)_{NK2}, (TK)_{NK3} \ldots\}$ is stored. The verification of the validity of the key $(TK)_{NK}$ is thus carried out on line and only an acceptance or refusal message, eventually with a signature key, will then be returned to the converter module (CC). The advantage of this variant is that it relieves the decoder of the tasks which can become important especially with a list whose length can only increase with the number of installed domestic networks.

The advantage of the embodiment of the list of network keys to invalidate is the possibility to define the test key locally. In fact, if this test key is known, it is possible to program a terminal module to answer by a random value when it receives such a key and then pass successfully the verification step even its network key is invalidated.

Of course, the verification center can generate files in which a different test key is used but it needs to download regularly these information in each decoder. This solution is impossible for the case of a DVD reader.

That is why, within the framework of this invention, the session key randomly generated by the converter module can also be used as test key. If the terminal module does not use the network key for encrypting this session key in order to bypass the verification step, the data encrypted afterwards by this session key will never be handled by the local network linked to this converter module. The terminal module is obliged to use the network key and the verification can be carried out by the converter module thanks to the calculation by the latter of the cryptogram of the session key with all invalidated network keys.

If one does not wish to use the session key as test key, for example because certain calculations are carried out in the decoder (or DVD reader) and it is not desirable to take this key out of the converter module, the data exchange protocol between the converter module and the terminal module can include the sending of several session keys (for example three) which will be encrypted by the network key in the terminal module. The three cryptograms are sent back to the converter module which decides randomly which one will be used as session key, and which one will be used only for the verification step.

Although it is implied that the verification method described above is carried out at each negotiation of a session key, it is possible to make this verification at larger intervals. For this, the converter module stores the identifier of the terminal module with which it was connected and does not need to renew this verification as long the converter module broadcasts data to the same terminal module.

The invention claimed is:

1. A method for verifying validity of a network key in a digital domestic network, communicating with at least a broadcasting device and at least one processing device, the broadcasting device having encrypted data to broadcast to the processing device, the method comprising:
providing the encrypted data accessible by the processing device due to a network key unknown by the broadcasting device;
transmitting by the broadcasting device a test key to the processing device,
receiving from the processing device a cryptogram made up of the test key encrypted by the network key, and
determining the validity of the network key by comparing the received cryptogram with at least one of a plurality of control cryptograms taken from a list of control data generated by a verification center for the test key,
wherein the control cryptograms are in a black list containing cryptograms obtained by encrypting the test key with invalid network keys or in a white list containing the cryptograms obtained by encrypting the test key with valid network keys.

2. The method according to claim 1, wherein the test key and the control cryptograms are generated by the verification center and transferred to the broadcasting device.

3. The method according to claim 1, wherein the test key is randomly generated by the broadcasting device and used as session key for the encryption of the encrypted data.

4. The method according to claim 3, wherein the broadcasting device generates at least two test keys and transmits the at least two test keys to the processing device, received from the processing device the corresponding cryptograms, selects one control cryptogram from the list of control data and the associated test key for the verification operations and another control cryptogram and the associated test key as session key for the encryption of the data encryption.

5. The method according to claim 1, wherein an error signalization inviting the user to change the terminal module is generated when a received cryptogram is present in the black list and refused during the comparison.

6. The method according to claim 1, wherein the broadcasting device comprises a converter module in charge of the verification operations.

7. The method according to claim 1, wherein the processing device comprises a terminal module storing the network key.

8. The method according to claim 7, wherein an error signalization inviting the user to change the terminal module is generated when a received cryptogram is present in the black list or absent of the white list, the received cryptogram being refused during the comparison.

9. The method according to claim 1, wherein the control data includes an address indicating where the control cryptograms can be downloaded via Internet by the broadcasting device, the control cryptograms being stored in the memory of the broadcasting device.

10. The method according to claim 9, wherein the control cryptograms are stored in a memory of the broadcasting device, and the comparison with the received cryptogram is carried out by the broadcasting device.

11. The method according to claim 9, wherein the converter module verifies the authenticity of the list of control data via a signature on the data.

12. The method according to claim 1, wherein the control data is generated in the verification center, the broadcasting device transmits the received control cryptogram and the locally generated test key to the verification center for carrying out the verification.

13. The method according to claim 1, wherein the broadcasting device is a DVD disc reader for reading a disk, the disc includes at least one of the encrypted data and the list of control data.

14. The method according to claim 1, wherein the broadcasting device is a pay television decoder receiving the encrypted data and the list of control data from a managing center.

15. The method according to claim 1, wherein an error signalization inviting the user to change the terminal module is generated when a received cryptogram is absent of the white list and refused during the comparison.

16. The method according to claim 1 wherein the list of control data is generated in the verification center, the broadcasting device transmits the received control cryptogram generated by the processing device based on the test key received by the broadcasting device from the verification center, the verification center carrying out the verification.

* * * * *